United States Patent [19]
Huber et al.

[11] Patent Number: 5,971,072
[45] Date of Patent: Oct. 26, 1999

[54] INDUCTIVE COUPLER ACTIVATED COMPLETION SYSTEM

[75] Inventors: Klaus B. Huber; Joe C. Hromas, both of Sugar Land; Nolan C. Lerche, Stafford, all of Tex.

[73] Assignee: Schlumberger Technology Corporation, Sugar Land, Tex.

[21] Appl. No.: 08/934,532

[22] Filed: Sep. 22, 1997

[51] Int. Cl.⁶ .............................. G01V 1/00; E21B 34/06
[52] U.S. Cl. .......................... 166/297; 166/55; 166/66.5
[58] Field of Search ........................... 166/297, 55, 55.1, 166/66.5, 66.6, 66.7, 66

[56] References Cited

U.S. PATENT DOCUMENTS

| | | |
|---|---|---|
| 4,806,928 | 2/1989 | Veneruso . |
| 4,901,069 | 2/1990 | Veneruso . |
| 5,025,861 | 6/1991 | Huber et al. . |
| 5,050,675 | 9/1991 | Upchurch ................................ 166/66.5 |
| 5,050,682 | 9/1991 | Huber et al. . |
| 5,095,993 | 3/1992 | Huber et al. . |
| 5,273,116 | 12/1993 | Ross ........................................ 166/66.5 |
| 5,293,940 | 3/1994 | Hromas et al. . |
| 5,318,126 | 6/1994 | Edwards et al. . |
| 5,366,013 | 11/1994 | Edwards et al. . |
| 5,429,192 | 7/1995 | Huber et al. . |
| 5,598,894 | 2/1997 | Burleson et al. ........................ 166/297 |
| 5,680,905 | 10/1997 | Green et al. ............................. 166/297 |

OTHER PUBLICATIONS

Excerpts from "Schlumberger Perforating Services", Schlumberger Wireline & Testing Services, 1995, pp. iii–x, 9–31, 9–32 (10 pages).

"Perforating" by Bell et al., SPE Monograph Series, 1995 (ISBN 1–5563–059–6).

*Primary Examiner*—William Neuder
*Attorney, Agent, or Firm*—Gordon Waggett; John Ryberg; Jeffrey E. Griffin

[57] ABSTRACT

A well completion apparatus disposed in a wellbore having first and second tubings and a tool disposed in the second tubing. An inductive coupler has a male coil located in the first tubing and is configured to receive an input signal. A female coil in the inductive coupler is attached to the first tubing and is electrically connected to the tool for inductively coupling to the male coil. An output signal is induced in the female in response to the input signal received in the male coil, and the output signal is provided to activate the tool in response to the input signal.

27 Claims, 15 Drawing Sheets

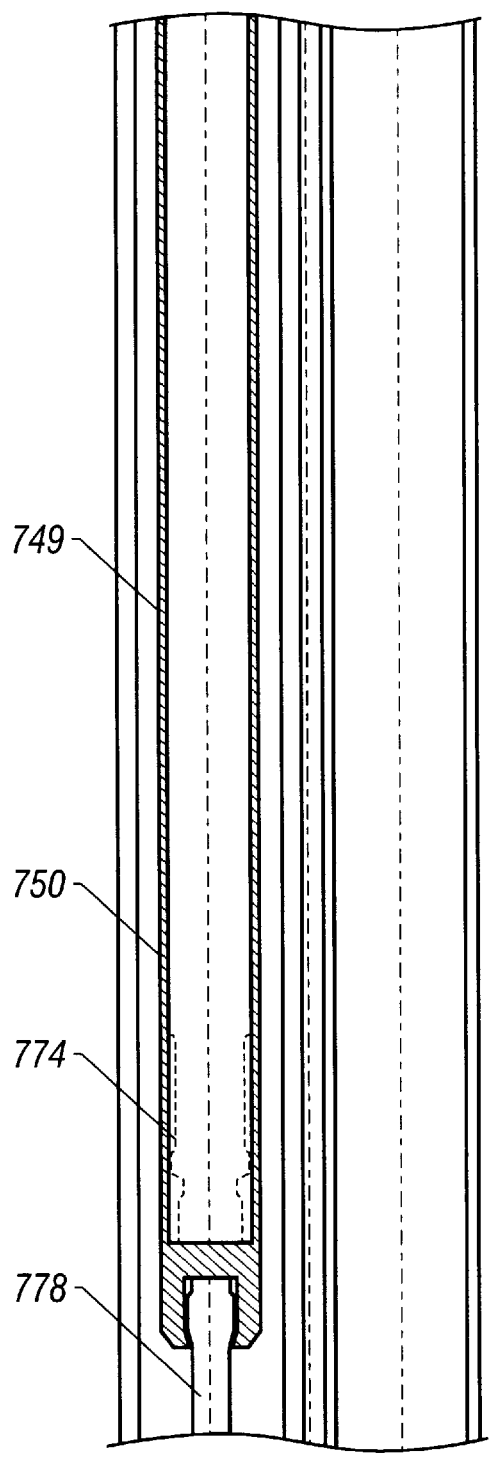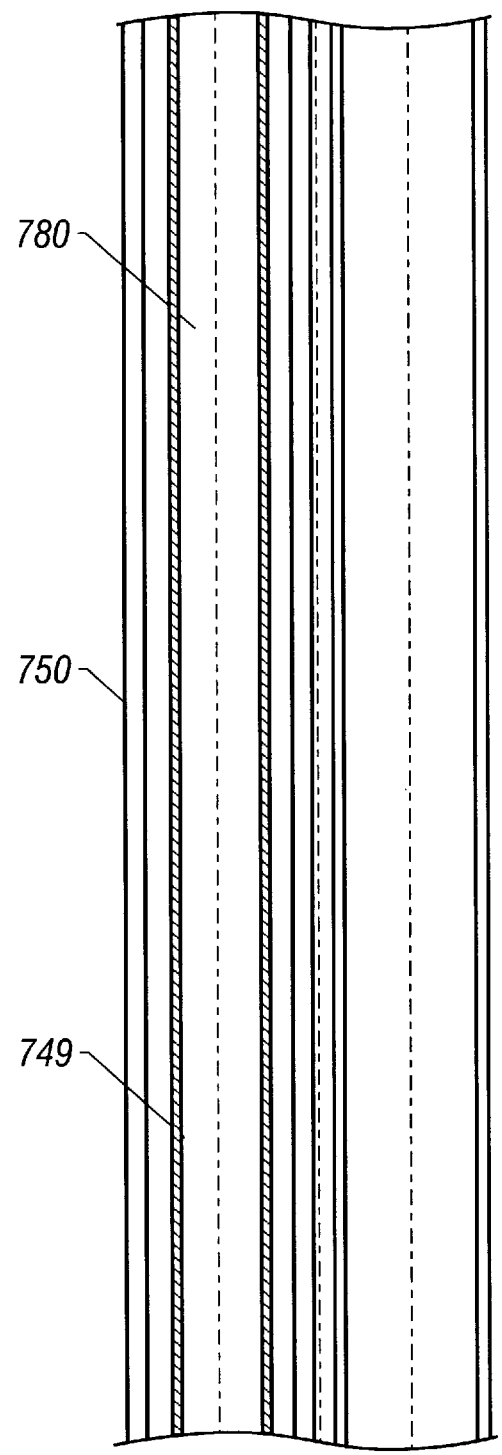
FIG. 9D
FIG. 9E

INDUCTIVE COUPLER ACTIVATED COMPLETION SYSTEM

BACKGROUND

The invention relates to an inductively coupler activated completion system.

After a well has been drilled and a casing has been cemented in the well, the well is completed by lowering production tubing into the wellbore and perforating one or more portions of the casing adjacent pay zones to allow fluid from the surrounding formation to flow into the well for production to the surface. In addition, packers are set to isolate the perforated region and production valves are used to control the flow of production fluid. The packers and production valves can be electrically activated.

To perforate, perforating guns are lowered on a tool string into the well and the guns are fired to create openings in the casing and to extend perforations into the surrounding formation. In an electrically-actuated perforating system, an actuating electric current is transmitted down an electric conductor (extending through a wireline or coiled tubing) to a firing head connected to fire a perforating gun string. In a conventional electrically-actuated firing system, a continuously contacting electrical connection (in the form of electrical wires and connectors) extends from the well surface to an electric detonator in the firing head. An electric current is then transmitted through the electrical wires and connectors to activate the electric detonator and fire the perforating gun.

In other electrically-actuated firing systems, such as that disclosed in U.S. Pat. No. 4,544,035, entitled "Apparatus and Method for Use in Detonating a Pipe-Conveyed Perforating Gun," inductive coupling has been used to activate and fire a perforating gun. In the system disclosed in the '035 patent, a male conductor wire and a female conductor wire are used, in which the male and female conductor wires are separately lowered downhole. After the female coupling member is in the desired position, the male coupling member is lowered into and received by the female coupling member. An electrical alternating or pulsating current is then generated in the conductor wire of the male coupling member, and the current is inductively coupled to the conductor wire of the female coupling member. The current is used to fire the perforating gun.

SUMMARY

In general, in one aspect, the invention features a well completion apparatus disposed in a wellbore, the apparatus having first and second tubings and a tool disposed in the second tubing. An inductive coupler includes a male coil located in the first tubing and configured to receive an input signal. A female coil is attached to the first tubing and is electrically connected to the tool for inductively coupling to the male coil. An output signal is induced in the female coil in response to the input signal received in the male coil, the output signal being provided to activate the tool.

Implementations of the invention may include one or more of the following features. The tool includes a perforating gun. A second tool is disposed in a third tubing. The inductive coupler has a second female coil attached to the third tubing and electrically connected to the second tool for inductively coupling to the male coil. A second output signal is induced in the second female coil in response to the input signal received in the male coil when the male coil is positioned adjacent the second female coil. The second output signal is provided to activate the second tool. The male coil is movable in the first tubing for selectively positioning the male coil adjacent the first and second female coils.

In general, in another aspect, the invention features a well completion apparatus disposed in a wellbore having a first zone and a second zone, the apparatus having a tubing extending through the second zone and to the first zone. First and second tools are disposed in the first and second zones, respectively. An inductive coupler includes a male coil located in the tubing and configured to receive an input signal. A first female coil is electrically connected to the first tool, and a second female coil is electrically connected to the second tool. The male coil is moveable in the tubing for selectively positioning the male coil adjacent the first and second female coils to selectively activate the first and second tools in response to the input signal.

In general, in another aspect, the invention features a well completion apparatus disposed in a wellbore, the apparatus including first and second tubings and a tool disposed in the second tubing. An energy coupler includes an energy source located in the first tubing and configured to generate an activating signal. A signal generator is attached to the second tubing and is configured in an electrically contactless manner to receive the activating signal. The signal generator is connected to drive an output signal in response to detection of the activating signal to activate the tool.

In general, in another aspect, the invention features a well completion apparatus disposed in a wellbore having a first zone and a second zone, the apparatus including a tubing extending through the second zone and to the first zone. First and second tools are disposed in the first and second zones, respectively. An energy coupler includes an energy source located in the tubing and configured to generate an activating signal. A first energy generator is responsive to the activating signal and is electrically connected to the first tool, and a second energy generator is responsive to the activating signal and is electrically connected to the second tool. The energy source is movable in the tubing for selectively positioning the energy source adjacent the first and second energy generators to selectively activate the first and second tools.

In general, in another aspect, the invention features a method of activating a tool located in a first tubing in a wellbore. A male coil member is lowered down a second tubing. An input signal is provided to the male coil member when the male coil member is positioned adjacent a female coil member attached to the first tubing. An output signal is induced in the female coil member to activate the tool.

In general, in another aspect, the invention features a method of activating first and second tools disposed in first and second zones, respectively, of a wellbore. A male coil member is lowered through a tubing extending through the second zone and to the first zone. First and second female coils are electrically connected to the first and second tools, respectively. An input signal is provided to the male coil member once the male coil member is selectively positioned adjacent the first or second female coil. An output signal is generated in the first or second female coil to activate the first or second tool.

In general, in another aspect, the invention features a method of activating a tool located in a first tubing in a wellbore. An energy source is lowered down a second tubing. The energy source is energized to generate an activating signal when the energy source is positioned adjacent a signal generator attached to the first tubing. The activating signal is communicated to the signal generator in an electrically contactless manner. An output signal is produced by the signal generator in response to the activating signal to activate the tool.

In general, in another aspect, the invention features a method of activating first and second tools disposed in first and second zones, respectively, of a wellbore. An energy source is lowered through a tubing extending through the second zone and to the first zone. The first and second signal generators are electrically connected to the first and second tools, respectively. The energy source is energized to generate an activating signal once the energy source is selectively positioned adjacent the first or second signal generator. The activating signal is communicated to the first or second signal generator in an electrically contactless manner. An output signal is generated by the first or second signal generator in response to the activating signal to activate the first or second tool.

In general, in another aspect, the invention features a well completion apparatus disposed in a wellbore. The apparatus includes first and second tubings, a perforating gun disposed in the second tubing, and an inductive coupler. The inductive coupler has a male coil located in the first tubing and is configured to receive an input signal. The inductive coupler also has a female coil attached to the first tubing that is electrically connected to the tool for inductively coupling to the male coil. An output signal is induced in the female coil in response to the input signal received in the male coil, wherein the output signal is provided to activate the perforating gun. The perforating gun has an electrically-activated firing module, a detonating assembly, and an actuating system connected to the firing module for ballistically connecting the firing module to the detonating assembly once a minimum amount of fluid pressure is applied to the actuating system.

The invention may have one or more of the following advantages. The electrically-actuated completion system does not require a continuously contacting electrical connection between the well surface and the completion apparatus. Electrical actuation of completion systems is made easier in multi-zone completion wells using such a contactless system. Safety mechanisms allow safe operation of a perforating device.

BRIEF DESCRIPTION OF DRAWINGS

FIGS. 9A–9F are diagrams of the firing module.

DETAILED DESCRIPTION

Figure 1:
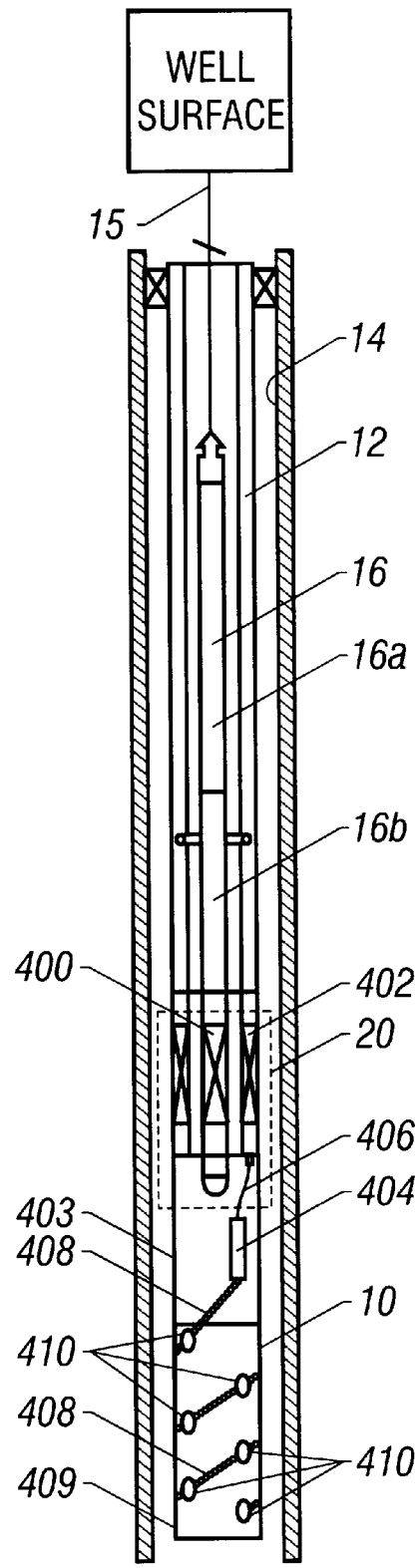
FIG. 1 is a diagram of a perforation system having an inductive coupler activated firing system.

Referring to FIG. 1, an inductive coupler activated completion system includes an inductive coupler 20 attached to a perforating apparatus 10 and the bottom end of a production tubing 12. The inductive coupler 20 is similar to inductive couplers described in U.S. Pat. Nos. 4,806,928 and 4,901,069, both assigned to the assignee of the present application, which are hereby incorporated by reference. The perforating apparatus 10 includes a perforating gun string 409 and a firing head 403 having an electric detonator 404. The production tubing 12 is disposed downhole in a well inside a casing 14.

The inductive coupler 20 includes a male coil 400 and a female coil 402 which are separately lowered downhole. The male coil 400 is lowered by a male coil carrying tool 16, which is suspended by a wireline 15 from the well surface. Alternatively, the tool 16 can be suspended by coiled tubing. The female coil 402 is attached to the bottom end of the production tubing 16.

When the male coil 400 is vertically aligned inside the inductive coupler 20 and activated from the surface via the wireline 15, an electric current is induced inside the female coil 402 and transmitted to fire the perforating apparatus 10. Although the male coil 400 is positioned adjacent the female coil 402, actual electrical contact is not made. In this manner, an electrically "contactless" connection exists between the male coil and female coil for transmitting activation signals from a source at the well surface to the electrical detonator 404 in the perforating apparatus 10.

The tool 16 includes a depth sensor 16a (such as a casing collar locator or CCL) for determining the depth of the tool 16 and an anchor 16b for anchoring the tool 16 to the inner walls of the production tubing 12.

The female coil 402 is connected to the electrical detonator 404 (which can be a 50-ohm resistor type detonator) in the perforating apparatus 10 by an electric conductor 406, with the detonator 404 being activated by an alternating current (AC) signal induced in the female coil 402. The electric detonator 404 is further connected to a detonating cord 408, which is in turn connected to shaped charges 410 in the gun string 409.

Figure 2:
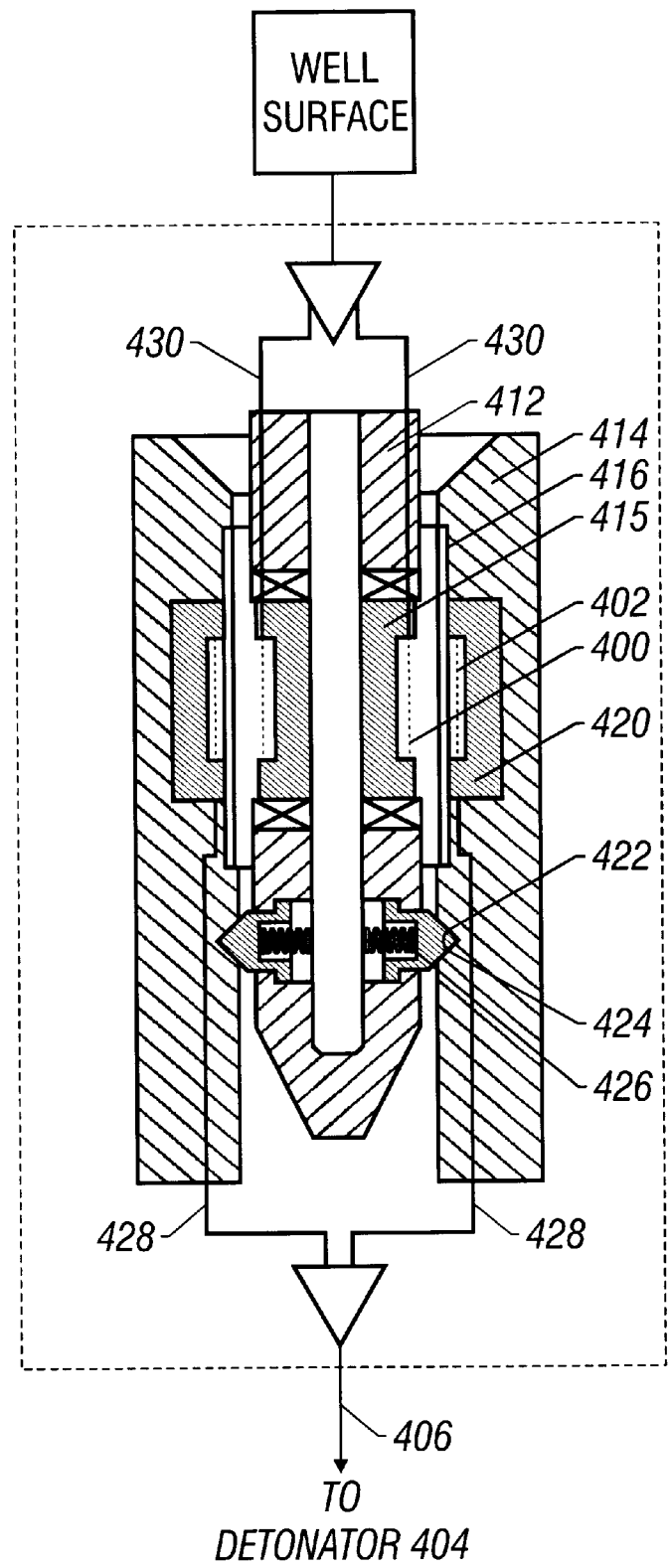
FIG. 2 is a diagram of an inductive coupler.

Referring to FIG. 2, the inductive coupler 20 includes an inductive coupler male member 412 that is physically attached to the tool 16 and a female housing member 414 that is physically attached to the production tubing 12. A male core 415 forms a part of the inductive coupler male member 412, with the male coil 400 being wound circumferentially around the core 415 and being connected to conductors 430 to the well surface. In one embodiment, the core 415 is tape-wound from a single iron piece, heat-treated in about 5% hydrogen at about 1500° F., and vacuum-impregnated with epoxy.

In an alternative embodiment, the male core 415 of the inductive coupler 20 can include any material that has a magnetic permeability greater than that of air and an electrical resistivity greater than that of iron. This material can, for example, include a ferrite material that includes ceramic magnetic materials formed of ionic crystals and having the general chemical composition $(Me)Fe_2O_3$, in which Me is a metal ion selected from a group consisting of manganese, nickel, zinc, magnesium, cadmium, cobalt, and copper, and having a curing temperature point greater than the anticipated maximum wellbore temperature to which the core 415 is to be exposed. The ferrite material can include an additive of no more than about 10% by weight of zirconia in a crystalline or noncrystalline form.

Other materials that have a magnetic permeability greater than that of air and an electrical resistivity greater than that of solid iron include iron-based magnetic alloy materials formed by winding thin foils of the iron alloy into tape form or by laminating thin foils of iron alloy together and by interweaving an insulator material in between adjacent layers of the iron alloy foils. A more detailed description of the core 415 of the inductive coupler 20 is described in U.S. Pat. Nos. 4,806,928 and 4,901,069, referenced above.

The inductive coupler male member 412 includes a latch mechanism 424 adapted for vertically aligning the male coil 400 and the female coil 402. The female housing member 414 is a steel outer housing that includes a stainless steel non-magnetic bobbin 416. The female coil 402 is spooled circumferentially onto the bobbin 420 and is connected to the detonator 404 via electric conductors 428 and 406.

The female housing member 414 is annular in shape (since it is attached to the housing of the production tubing 16) and has an inner diameter to receive the male coil member 412. Only vertical alignment is required, with physical contact or azimuth or annular alignment not needed for transferring power from the male coil 400 to the female coil 402. Both the female and male coils are enclosed within steel housings to protect the windings of the male and female coils from well fluids.

Figure 3:
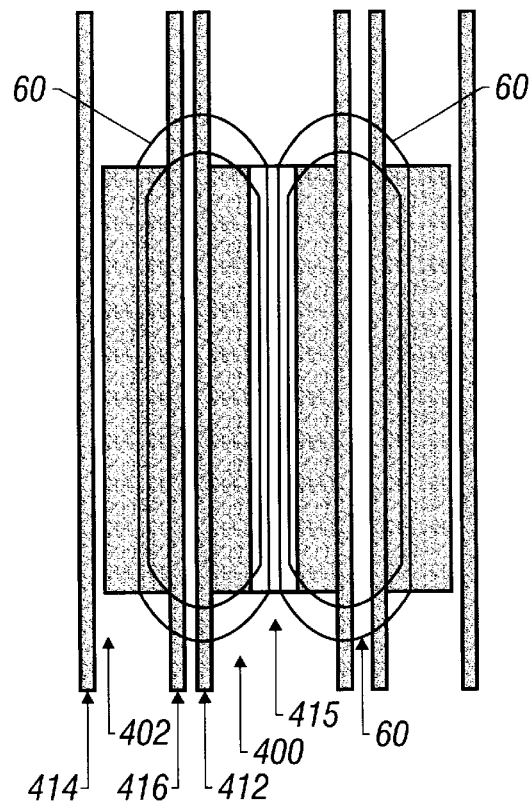
FIG. 3 is a diagram of the flux pattern generated in the inductive coupler.

Referring to FIG. 3, a magnetic flux field 60 is established when the male coil 400 is energized by an alternating current signal from an electrical power source at the well surface. Alternatively, the electrical power source can be carried down with the carrying tool 16 and located downhole. Electrical current through the male coil 400, which is wound around the core 415 of the inductive coupler male member 412, induces the magnetic flux field 60, which in turn induces an electrical current through the female coil 402 spooled onto the bobbin 416.

Figure 4:
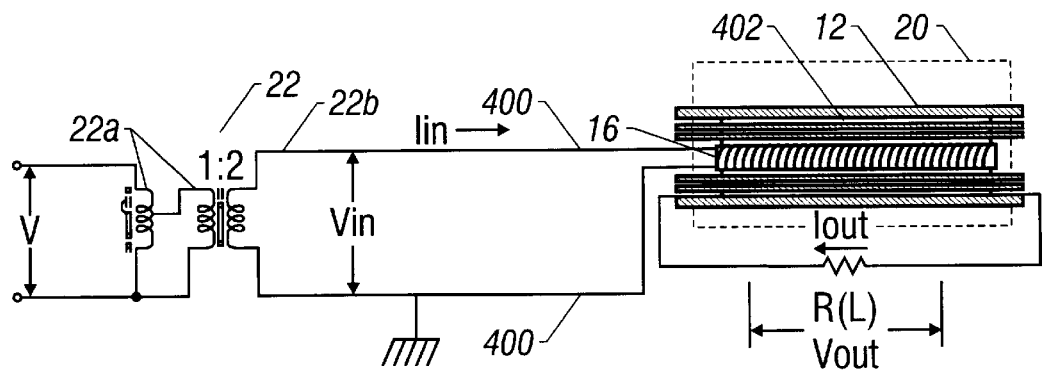
FIG. 4 is a diagram of an input circuit connected to the male coil of the inductive coupler.

Referring to FIG. 4, an input circuit is connected to the male coil 400 of the male member 412. The input circuit can be located at the well surface and includes a transformer 22 having a primary coil 22a and a secondary coil 22b. The secondary and primary coils of the transformer 22 have a 2:1 turn ratio. The primary coil 22a of the transformer 22 is powered using a 50–60 hertz AC power source. A 50-ohm load resistor RL (representing the electric detonator 404) is connected to the female coil 402 of the inductive coupler 20 at its output. Typically, approximately one ampere (A) is induced in the 50-ohm load resistor RL when an input voltage to the primary coil 22A of the transformer 22 is about 250 volts AC and an input current to the primary coil 22a is about 750 milliamps (mA). The efficiency achieved is about 27%, which is sufficient to perform many downhole operations, including firing a perforating apparatus.

In operation, once the male coil 400 on the tool 16 is lowered down the production tubing 12 and aligned with the female coil 402, the anchor section 16b is set to anchor the tool 16 to the inner walls of the production tubing 12. The male coil 400 of the inductive coupler 20 is energized by an alternating current energizing signal originating from the transformer 22 (FIG. 4). With the assistance of the core 415 of the inductive coupler 20, a magnetic flux is set up between the male coil 400 and a female coil 402, thereby inducing an alternating current in the female coil 402. The alternating current in the female coil to 402 then activates the detonator 404 via the conductor 406. Upon detonation, a detonating wave is propagated down the detonating cord 408 to produce sequential detonations of the shaped charges in the perforating apparatus 10.

Figure 5:
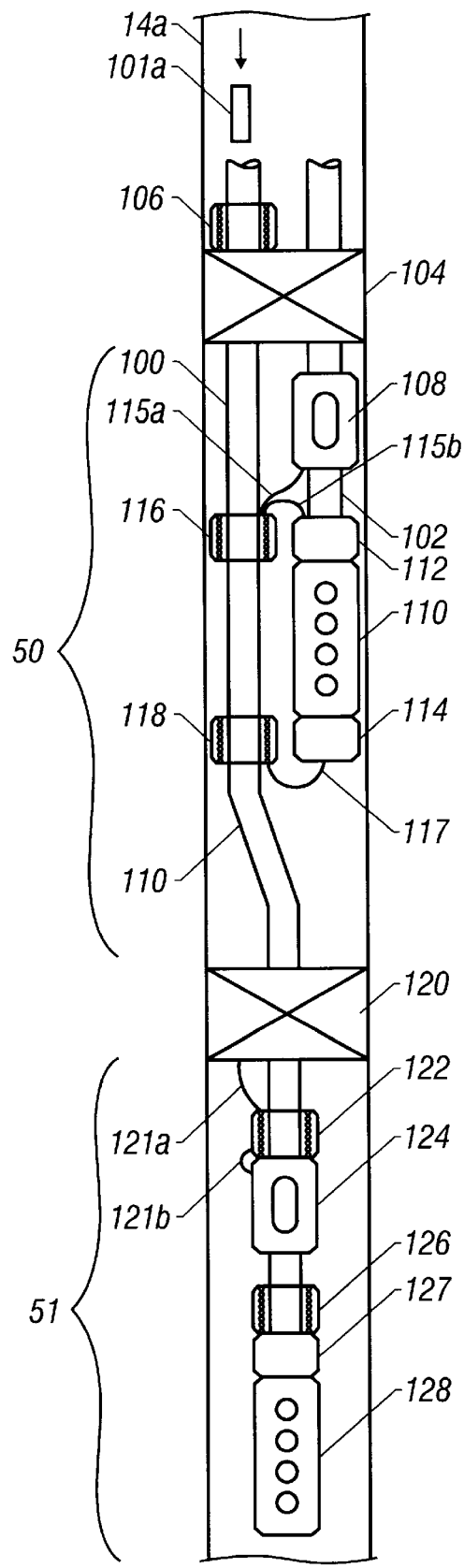
FIG. 5 is a diagram of an inductive coupler activated completion system for use in a dual-zone completion.
Figure 6:
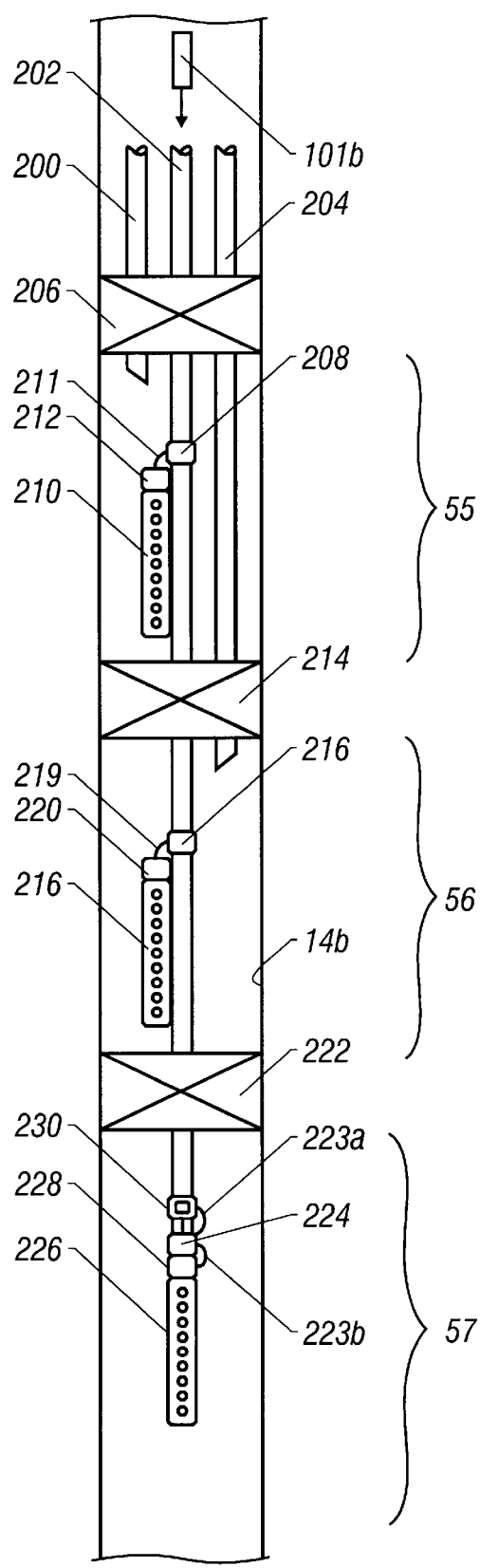
FIGS. 6 and 7 are diagrams of inductive coupler activated completion system for use in multi-zone completions.
Figure 7:
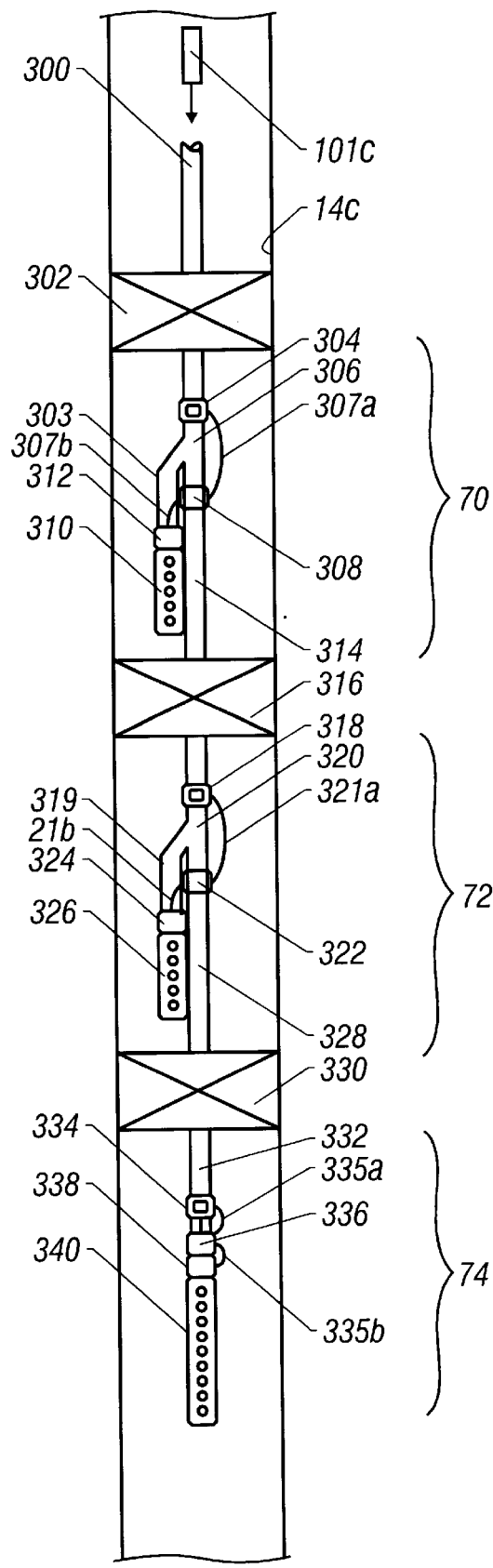
Figure 8:
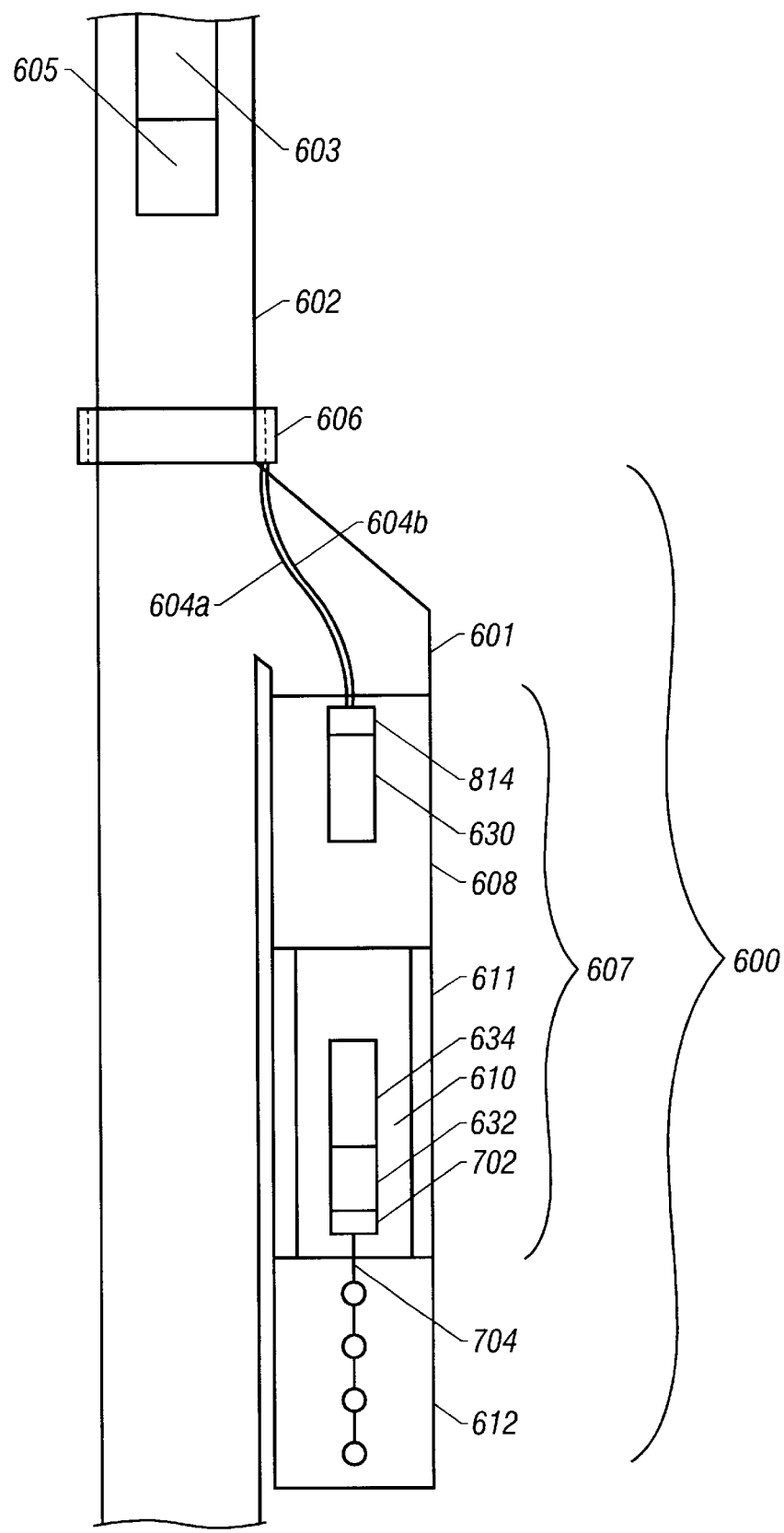
FIG. 8 is a diagram of an inductive coupler activated completion system for use in a multi-zone completion and which includes a firing module and a hydraulic delay module.

Referring to FIGS. 5–7, an inductive coupler activated completion system may be used in connection with a dual or multi-zone completion, in which different zones of a formation traversed by a wellbore are perforated sequentially in response to a longitudinal movement and activation at different points in the wellbore of the male member 412 carried by the tool 16 down the production tubing 12.

Referring to FIG. 5, a dual-zone completion includes a first production tubing 100 disposed within a casing 14a, and a second production tubing 102 disposed next to the first production tubing 100 in the casing 14a. Both tubings 100 and 102 pass through a dual packer 104 to a first zone 50. In addition, lower in the well, the production tubing 100 passes through a single packer 120 to a second zone 51. The packers 104 and 120 (which include a setting apparatus activable by electric current) are set to isolate the two zones 50 and 51. Portions of an exemplary packer are discussed in FIG. 15.

To perforate in the two zones 50 and 51, two perforating guns are used, with a first perforating gun 110 in the production tubing 102 and a second perforating gun in the second zone 51. Once perforation is performed, fluid from the perforated formations are separately produced to the well surface through the two production tubings 100 and 102.

The production tubings 100 and 102 also include electrically-activated production valves 124 and 108, respectively, to control the flow of production fluid up the tubings. A production valve that is electrically controllable is discussed with respect to FIGS. 11–14. For production, the packers 104 and 120 are set, the production valves 108 and 124 are opened, and the perforating guns 110 and 128 are fired to create perforations to allow fluid to flow from the surrounding formation to the surface.

To set the packers, open the production valves, and fire the perforating guns, five inductive couplers 106, 116, 118, 122, and 126 are used. The first inductive coupler 106 is electrically connected to activate the dual packer 104. The second inductive coupler 116 is electrically connected to a top firing head of the perforation gun 110 by a wire 115b. The third inductive coupler 118 is electrically connected to a bottom firing head 114 of the perforating gun 110 by a wire 117. The perforating gun 110 is associated with top and bottom firing heads to allow an operator to control the sequence in which the shaped charges in the perforating gun 110 are fired, i.e., from top down or from bottom up.

A fourth inductive coupler 122 is electrically connected to set the single packer 120 and the production valve 124 over wires 121a and 121b, respectively. Finally, the fifth inductive coupler 126 is electrically connected to the firing head 127 of the perforating gun 128.

In operation, a male member 101a having a male coil is lowered down the first production tubing 100. When the male member 101a is vertically aligned with the female coil of the first inductive coupler 106, and the male coil is energized, current induced in the female coil of the inductive coupler 106 energizes and sets the dual packer 104 in the casing 14. Next, the male member 101a is lowered in the production tubing 100 until it is vertically aligned with the female coil of the second inductive coupler 116. If the male coil is again energized, the induced output signal from the female coil of the inductive coupler 116 energizes and opens the production valve 108. At the same time, the same output signal energizes the top firing head 112, thereby detonating the shaped charges in the first perforating gun 110 from top down.

If the operator desires to fire the shaped charges in the reverse direction, that is, from the bottom up, then the male coil is first energized when it is vertically aligned to the third inductive coupler 118. Energizing the third inductive coupler 118 activates the bottom firing head 114 to detonate the shaped charges in the first perforating gun 110 from the bottom up. A firing head located on the top and bottom of a gun provides redundancy in case the primary firing head does not function properly.

After the shaped charges of the perforating gun 110 have been detonated from the bottom up, the male member 101 is then raised until it is aligned with the second inductive coupler 116. The mail coil is energized to open the valve 108 over the wire 115a. As the gun 110 has already fired, energizing the second inductive coupler 116 does not cause re-firing.

At this point, the first zone 50 is producing fluid to the surface through the production tubing 102. Next, the male member 101a is further lowered down the first production tubing 100 into the second zone 51. Once vertically aligned with the female coil of the fourth inductive coupler 122, the male coil is energized to generate an output signal from the female coil to set the single packer 120 and, simultaneously, to open the production valve 124. The packer is set first before the upper zone is perforated.

Finally, the male member 101a is lowered again to align with the female coil of the fifth inductive coupler 126. The male coil is again energized to generate an output signal from the female coil of the fifth inductive coupler 126 to detonate the shaped charges in the second perforating gun 128. Production fluid in the second zone flows up to the well surface through the first production tubing 100.

Thus, using the inductive coupler activated completion apparatus, an electrically contactless system is provided to activate several electrically-activatable downhole components, including packers, valves, and perforating guns. Such electrically contactless activation is particularly advantageous in multi-zone completions, in which direct access to components in the multiple completions may be difficult.

FIG. 6 illustrates an inductive coupler multi-zone completion apparatus arranged using a "piggyback" technique. A first production tubing 200, a second production tubing 202, and a third production tubing 204 are disposed in a casing 14b. The male member 101b of an inductive coupler is lowered down by a carrying tool through the second production tubing 202.

Three production packers 206, 214, and 222 are used to isolate three zones 55, 56, and 57. Each zone is completed by the corresponding one of firing perforating guns 210, 216, and 226 using inductive couplers 208, 216, and 224, respectively, all integrally attached to the middle production tubing 202. The guns are fired as a male member 101b is lowered down the tubing 202 and energized next to the inductive couplers.

The multi-zone production packer 206 once set firmly holds the three production tubing strings 200, 202, and 204 in the wellbore. The first inductive coupler 208 is electrically connected to the firing head 212 of the perforating gun 210 by an electrical wire 211. An output signal in the female coil of the inductive coupler 208 (induced by the male coil in the male member 101b) activates the firing head 212 to fire the gun 210.

The second multi-zone production packer 214 receives and holds the second production tubing 202 and the third production tubing 204. All packers are set before any perforating is done. In the second zone 56, the second inductive coupler 216 is electrically connected to the firing head 220 of the second perforating gun 216 by a wire 219. The firing head 220 is activated by an output signal from the female coil of the inductive coupler 216 when the male coil of the male member 101b is energized in the inductive coupler 216.

The single production packer 222 receives and holds the second production tubing 202. The third inductive coupler 224 is electrically connected to the firing head 228 of the third perforating gun 226 by a wire 223b. A production valve 230 is also connected electrically to the inductive coupler 224 over a wire 223a. An output signal from the female coil of the inductive coupler 224 activates the firing head 228 and simultaneously opens the production valve 230 in response to energization of the male coil in the inductive coupler 224.

Referring to FIG. 7, an inductive coupler multi-zone completion perforating apparatus arranged in a "Y-tool" technique is illustrated. One production tubing 300 is disposed in the wellbore and extends through a casing 14c. Three zones 70, 72, and 74 are isolated using packers 302, 316, and 330. Each zone uses an inductive coupler activated completion system, with the zone 70 containing an inductive coupler 308 electrically connected to a firing head 312 of a perforating gun 310 by an electrical wire 307b; the second zone containing an inductive coupler 322 electrically connected to a firing head 324 of a perforating gun 326 by an electrical wire 321b; and the third zone 74 containing an inductive coupler 336 electrically connected to a firing head 338 of a perforating gun 340 by an electrical wire 335b.

To activate the perforating guns 310, 326, and 340, a male member 101c having a male coil of an inductive coupler is lowered down the production tubing 300. As it passes through each of the inductive couplers 306, 322, and 336, the male coil of the male member 101c is energized to induce electrical signals to the firing heads 312, 324, and 338 in the three different zones 70, 72, and 74.

In each zone, a short string branches from the main production tubing 300 in a "Y-tool" configuration. In the first zone 70, a production valve 304 is connected above the branch 306. The production valve 304 is electrically connected to the inductive coupler 308 by a wire 307a.

In the second zone 72, a short string 319 branches from the main production tubing 300 at 320. A second production valve 318 is positioned above the branch 320 and is electrically connected to the inductive coupler 322 by a wire 321a. In the third zone 74, a production valve 334 is positioned above, and is electrically connected by a wire 335a to, the inductive coupler 336.

In operation, the male member 101c is lowered down the production tubing 300 to vertically align next to inductive couplers 308, 322, and 336. When energized in the inductive coupler 308, the male coil of the male member 101c energizes the female coil to produce an output signal to activate the firing head 312 and to open the production valve 304. Next, the male member 101c is lowered down the production tubing 300 to the second zone 72 and is aligned inside the inductive coupler 322. The male coil is then energized to fire the perforating gun 326 and to open the valve 318. Finally, the male member 101c is lowered down the production tubing 300 to the inductive coupler 336, where it is energized to fire the perforating gun 340 and to open the valve 334.

As shown in FIGS. 5–7, different combinations of inductively coupler activated completion systems can be used in different completion configurations. Further features, such as safety features, can be added to the perforating apparatus used in these systems. For example, a delay mechanism can be added to the perforating apparatus to allow time for the male coil member to energize and then moved a distance away from the perforating apparatus before it fires. This protects the male coil member from any shock caused by the explosion. In addition, features to prevent accidental firing of the perforating apparatus can be incorporated. Such safety features are described in connection with FIGS. 8, 9A–9F, and 10A–10B, below.

Figure 11:
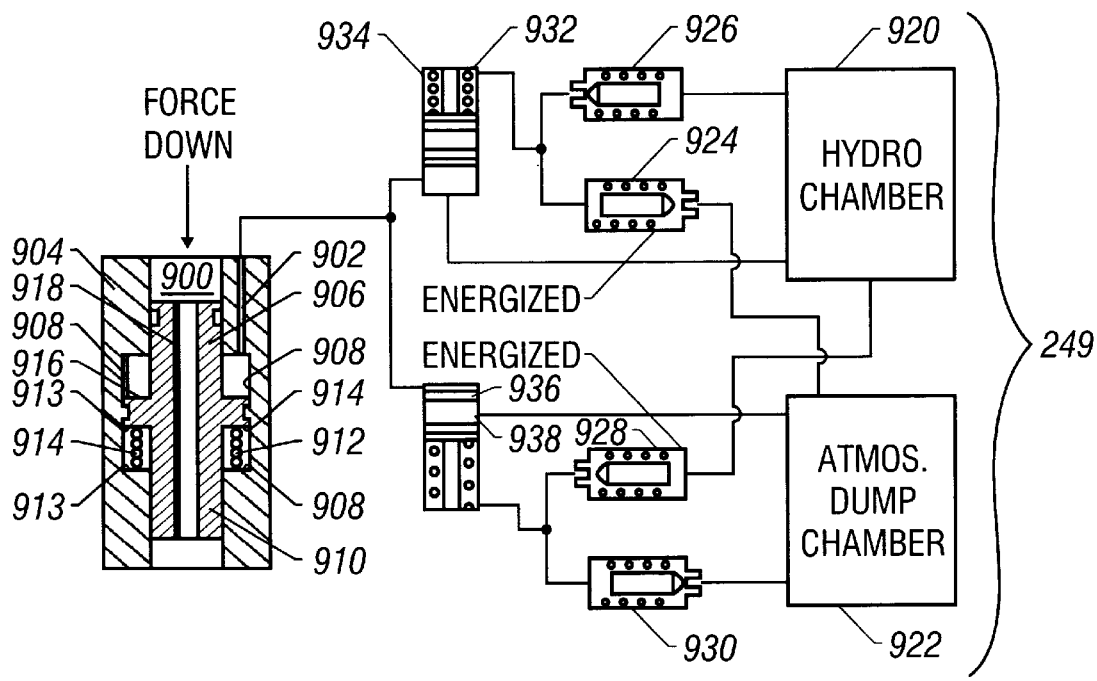
FIGS. 11–13 are diagrams of an electrically controllable production valve.
Figure 12:
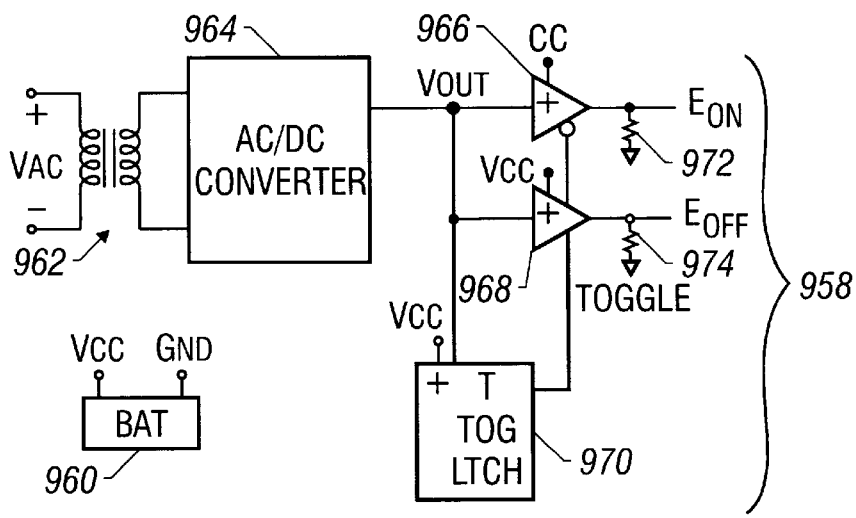
Figure 13:
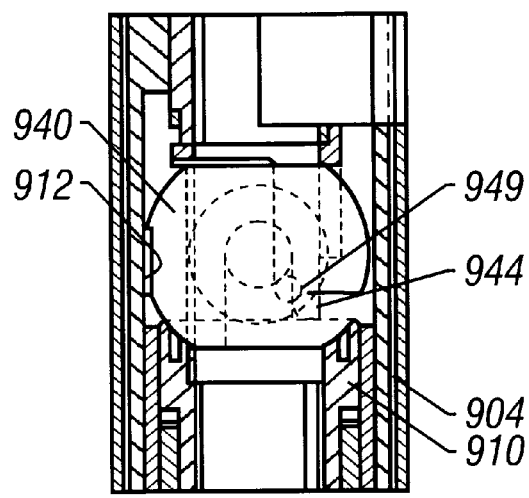

Referring to FIGS. 11–13, an exemplary electrically activatable production valve is described. As shown in FIG. 11, each valve uses a hydraulically operated tubular member 910 which through its longitudinal movement, opens and closes one of the valves. The member 910 is slidably mounted inside a tubular housing 904 of the test string 40. The member 910 includes a tubular mandrel 906 having a central passageway 900 coaxial with a central passageway 900 of the housing 904. The member also has an annular piston 914 radially extending from the exterior of the mandrel 906. The piston 914 resides inside a chamber 908 formed in the tubular housing 904.

The member 910 is forced up and down by using a port 902 in the housing 904 to change the force applied to an upper face 916 of the piston 914. Through the port 902, the face 916 is subjected to either to a hydrostatic pressure (a pressure greater than atmospheric pressure) or to atmospheric pressure. A compressed coiled spring 912 contacting a lower face 913 of the piston 914 exerts upward forces on the piston 914. When the upper face 916 is subject to atmospheric pressure, the spring 912 forces the member 910 upward. When the upper face 916 is subject to hydrostatic pressure, the piston 914 is forced downward.

The pressures on the upper face 916 are established by connecting the port 902 to either a hydrostatic chamber 920 (furnishing hydrostatic pressure) or an atmospheric dump chamber 922 (furnishing atmospheric pressure). Four solenoid valves 924–930 and two pilot valves 934 and 936 are used to selectively establish fluid communication between the chambers 920 and 922 and the port 902.

The pilot valve 934 controls fluid communication between the hydrostatic chamber 920 and the port 902, and the pilot valve 936 controls fluid communication between the atmospheric dump chamber 922 and the port 902. The pilot valves 934 and 936 are operated by the application of hydrostatic and atmospheric pressure to control ports 932 (pilot valve 934) and 938 (pilot valve 936). When hydrostatic pressure is applied to the control port the valve is closed, and when atmospheric pressure is applied to the control port, the valve is open.

The solenoid valve 926 controls fluid communication between the hydrostatic chamber 920 and the control port 932. When the solenoid valve 926 is energized, fluid communication is established between the hydrostatic chamber 920 and the control port 932, thereby closing the pilot valve 934. The solenoid valve 924 controls fluid communication between the atmospheric dump chamber 922 and the control port 932. When the solenoid valve 924 is energized, fluid communication is established between the atmospheric dump chamber 922 and the control port 932, thereby opening the pilot valve 934.

The solenoid valve 928 controls fluid communication between the hydrostatic chamber 920 and the control port 938. When the solenoid valve 928 is energized, fluid communication is established between the hydrostatic chamber 920 and the control port 938, thereby closing the pilot valve 936. The solenoid valve 930 controls fluid communication between the atmospheric dump chamber 922 and the control port 938. When the solenoid valve 930 is energized, fluid communication is established between the atmospheric dump chamber 922 and the control port 938, thereby opening the pilot valve 936.

Thus, to force the moving member 910 downward, (which opens the valve) the electronics 958 of the valve energize the solenoid valves 924 and 928. To force the moving member 910 upward (which closes the valve), electronics 958 energize the solenoid valves 926 and 930. The hydraulics of the tool are further described in U.S. Pat. No. 4,915,168, entitled "Multiple Well Tool Control Systems in a Multi-Valve Well Testing System," which is hereby incorporated by reference.

As shown in FIG. 12, the electronics 958 include a battery 960 having a terminal connected to ground and a terminal providing a voltage $V_{CC}$. A transformer 962 receives an AC voltage signal $V_{AC}$, and its outputs are connected to an AC/DC converter 964 for converting the received AC signal to a DC signal. Depending on the voltage level of the input signal $V_{AC}$, the transformer is adjusted to have the proper ratio to provide appropriate voltage levels to the AC/DC converter 964. The output signal $V_{OUT}$ has one of two states: a logic low (zero volts); or a logic high ($V_{CC}$). The output signal $V_{OUT}$ is provided to inputs of tristate solenoid drivers 966 and 968. The enable input of the tristate driver 966 is connected to the inverted state of a signal TOGGLE (from a toggle latch 970), and the enable input of the tristate driver 968 is connected to the signal TOGGLE. The output of the tristate drivers 966 and 968 drive signals $E_{ON}$ and $E_{OFF}$, respectively, which are also pulled low by weak pull-down resistors 972 and 974. Thus, if the signal TOGGLE is high, then the signal $E_{OFF}$ is driven high while the signal $E_{ON}$ is pulled low. On the other hand, if the signal TOGGLE is low, then the reverse is true ($E_{OFF}$ low and $E_{ON}$ high).

The toggle latch 970 is toggled on the rising edge of the output signal $V_{OUT}$ from the AC/DC converter 964. The toggle latch 970 in effect stores the state of the last production valve operation, that is, turn valve on or turn valve off. Asserting the signal $E_{ON}$ high energizes the solenoids 924 and 928 to turn the valve on, and asserting the signal $E_{OFF}$ high energizes the solenoids 926 and 930 to turn the valve off.

As shown in FIG. 13, the ball valve includes a spherical ball element 940 which has a through passage 942. An arm 904 attached to the moving member 910 engages an eccentric lug 944 which is attached through radial slots 946 to the element 940. By moving the member 910 up and down, the ball element 940 rotates on an axis perpendicular to the coaxial axis of the central passageway 900, and the through passage 942 moves in and out of the central passageway 900 to open and close the ball valve, respectively.

Figure 14:
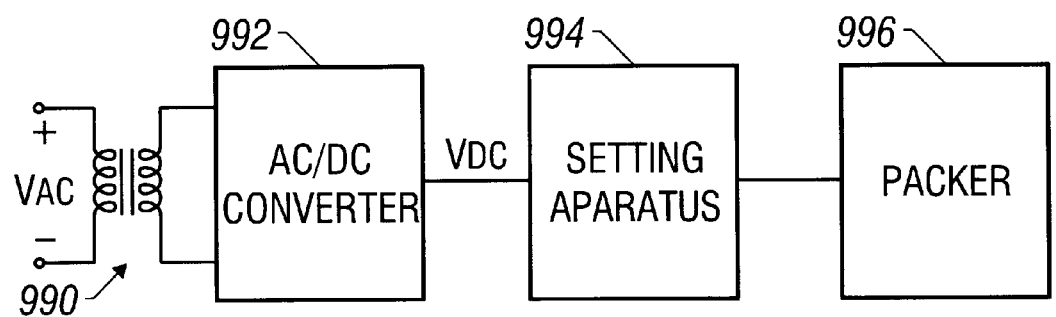
FIG. 14 is a diagram of an electrically activable packer.

Referring to FIG. 14, portions of an electrically activable packer is illustrated. The packer is associated with electronic circuitry for receiving an input signal induced in the female coil in response to activation by a male coil. A transformer 990 receives an AC voltage signal $V_{AC}$ from the female coil and its outputs are connected to the inputs of an AC/DC converter 992, which outputs a DC signal $V_{DC}$. The DC voltage signal $V_{DC}$ is provided to the input of a setting apparatus 994, such as that described in U.S. Pat. No. 5,146,983, entitled "Hydrostatic Setting Tool Including A Selectively Operable Apparatus Initially Blocking An Orifice Disposed Between Two Chambers and Opening In Response To A Signal," assigned to the assignee of the present application, and which is hereby incorporated by reference. A DC current from the AC/DC converter 992 activates the setting apparatus 994 to set a packer 996.

Referring to FIGS. 8, 9A–9F, and 10A–10B, an inductive coupler activated perforating apparatus 600 is used in a dual-zone completion arranged in a Y-tool configuration. The inductive coupler activated perforating apparatus 600 is positioned downhole in a short string 601 that is braced from a main production tubing 602. The perforating apparatus 600 includes a firing head 607 and a perforating gun 612.

The male member 605 of an inductive coupler 606 is lowered by a carrying tool 603. The female coil of the inductive coupler 606 is attached to the main production tubing 602. Electric conductors 604*a* and 604*b* extend from the female coil of the inductive coupler 606 to the firing head 607.

The firing head 607 includes a firing module 608 and a hydraulic delay module (HDM) 610. The housing 611 of the firing module 608 extends over the HDM 610 and connects to the perforating gun 612. The firing module 608 is activated in part by the transmission of an electric signal from the female coil of the inductive coupler 606 through the electric conductors 604*a* and 604*b*. Other events are also needed to activate the firing module 608 to ensure the safe firing of the perforating gun 612, particularly when the perforating gun 612 is located at the surface or initially is being lowered into the well.

As described in further detail below, the HDM 610 contains a percussion detonator 702 connected to a detonating cord 704 that is connected to shaped charges in the perforating gun 612. The percussion detonator 702 is attached to a firing pin assembly 632 that contains a firing pin and a locking mechanism (shown in FIG. 10B). The locking mechanism prevents movement of the firing pin until the occurrence of a chain of events initiated by transmission of an electrical current through the electric conductors 604*a* and 604*b* in the tubing. Once the locking mechanism is released in the firing pin assembly 632, hydrostatic pressure drives the firing pin into the percussion detonator 702 to initiate a detonation wave in the detonating cord 704.

The HDM 610 also includes a hydraulic delay mechanism 634 that delays the release of the locking mechanism. When the firing module 608 is electrically activated and certain other events have also occurred, the hydraulic delay mechanism is initiated to cause a delay for a predetermined amount of time before the locking mechanism is released to allow the firing pin to move. The delay provides added safety by allowing the operator at the well surface to move the carrying tool 603 and the male member 605 a safe distance away (or completely out of the wellbore) before the perforating gun 612 is fired. This protects equipment in the carrying tool from shock waves caused by the explosion and further, prevents the shock waves from being transmitted to the surface via the carrying tool and wireline and prevents inflow of well fluids from blowing the wireline up the hole.

The HDM 610 at its top end is connected to the firing module 608, which contains an electric detonator 814 (such as a 50-ohm resistor type detonator) coupled to a safety mechanism 630. The electric detonator 814 is activated by an electric current transmitted through the electric conductors 604*a* and 604*b*. The safety mechanism 630 in cooperation with the locking mechanism implement safety features to prevent accidental firing of the perforating gun 612 while it is on the surface or initially being lowered into the well.

The safety mechanism 630 includes a pressure-actuated release piston (FIGS. 9C–9D) and a frangible element (FIG. 9C) to fix the release piston in position. Two factors must be present before the release piston can move: the frangible element must be shattered; and a minimum amount of differential pressure must be applied to the release piston. Movement of the release piston by a predetermined distance initiates the hydraulic delay mechanism in the HDM 610. The frangible element is shattered by initiation of a detonation wave in a detonating cord in the safety mechanism 630 by the electric detonator 814.

Thus, to fire the perforating gun 612, several events have to occur. First, the male coil in the male member 605 of the inductive coupler 606 is lowered and vertically aligned to the female coil. An electric current is applied to the male coil and an electric current is induced in the female coil and transmitted through the electric conductors 604*a* and 604*b*. The electric current activates the electric detonator 814 and initiates a detonation wave in the detonating cord in the safety mechanism 630, which shatters the frangible element. The release piston is then freed to move if sufficient differential pressure is applied to the release piston. Movement of the release piston by a predetermined distance initiates the hydraulic delay mechanism 634. After a predetermined delay controlled by the hydraulic delay mechanism 634 to provide time to move the carrying tool 603 a safe distance away, hydrostatic pressure from well fluids then drives the firing pin in the HDM 610 into the percussion detonator 702 to fire the gun 612.

The perforating apparatus 600 is unable to fire while it is on the surface or initially being lowered downhole because of the lack of sufficient differential pressure (created by the hydrostatic pressure of the fluid in the well) to actuate the release piston in the safety mechanism 630. Thus, even if the perforating apparatus 600 is electrically activated accidentally (thereby shattering the frangible element), the safety mechanism 630 prevents firing of the perforating guns when the mechanism is not exposed to sufficient downhole pressure. The housing of the firing module 608 can withstand and contain the explosion of the shaped charge in the safety mechanism 630, which further reduces the risk of injury at the wellsite.

Although the detonating cord 704 running through the perforating gun 612 is connected to the percussion detonator 702 in the HDM 610, no effective ballistic connection exists in the firing module/HDM assembly until and unless a sufficient pressure is applied in the vicinity of safety mechanism 630 to apply the required differential pressure to actuate the release piston in the safety mechanism 630. The ballistic connection is not present in the absence of such pressure because, if the release piston has not been moved as a result of such pressure, the locking mechanism in the firing pin assembly 632 cannot be released to drive the firing pin into the percussion detonator 702. Thus, in the electrically-actuated perforating apparatus 600, one important safety feature is that the perforating apparatus 600 may be electrically connected before it is ballistically connected. The ballistic connection does not occur until the perforating apparatus 600 has been lowered to a depth at which sufficient pressure in the well is present to actuate the release piston.

Referring to FIGS. 9A–9F and 10A–10B, the firing module 608 includes two housing sections made of alloy steel: a bottom housing section 750 threadably connected to a top housing section 810. The HDM 610 includes a housing 712.

Figure 9A:
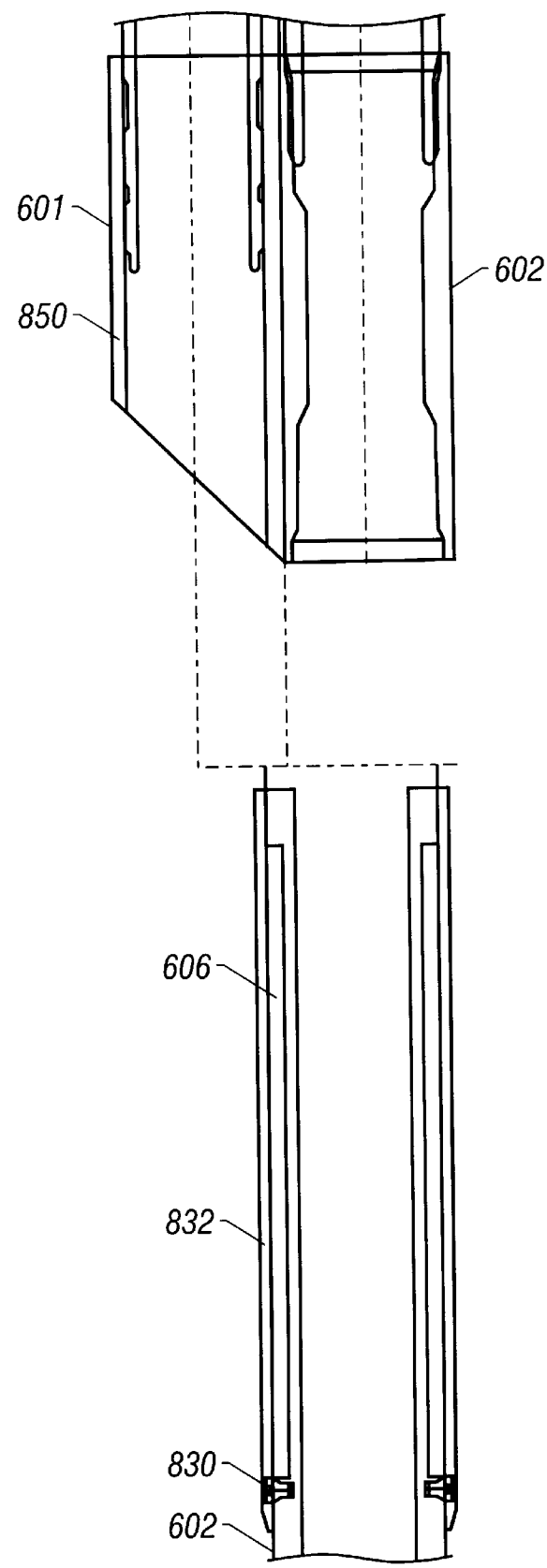
Figure 9B:
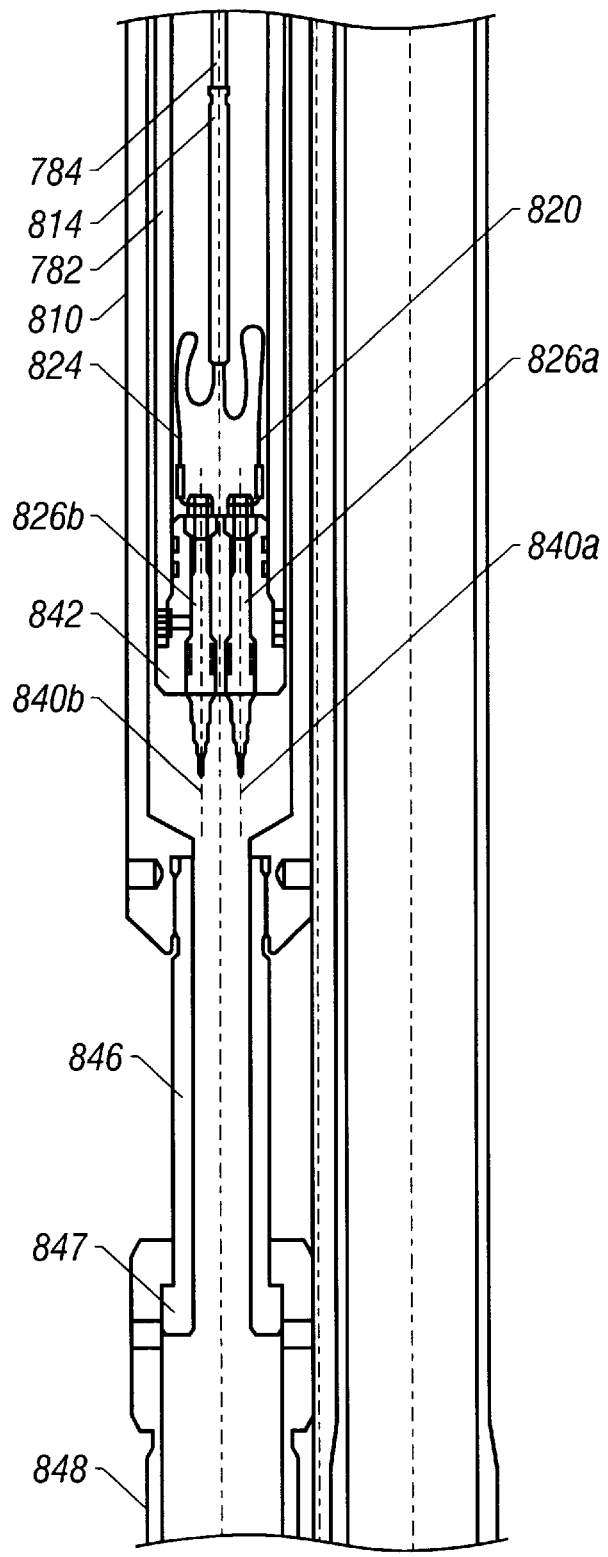
Figure 9C:
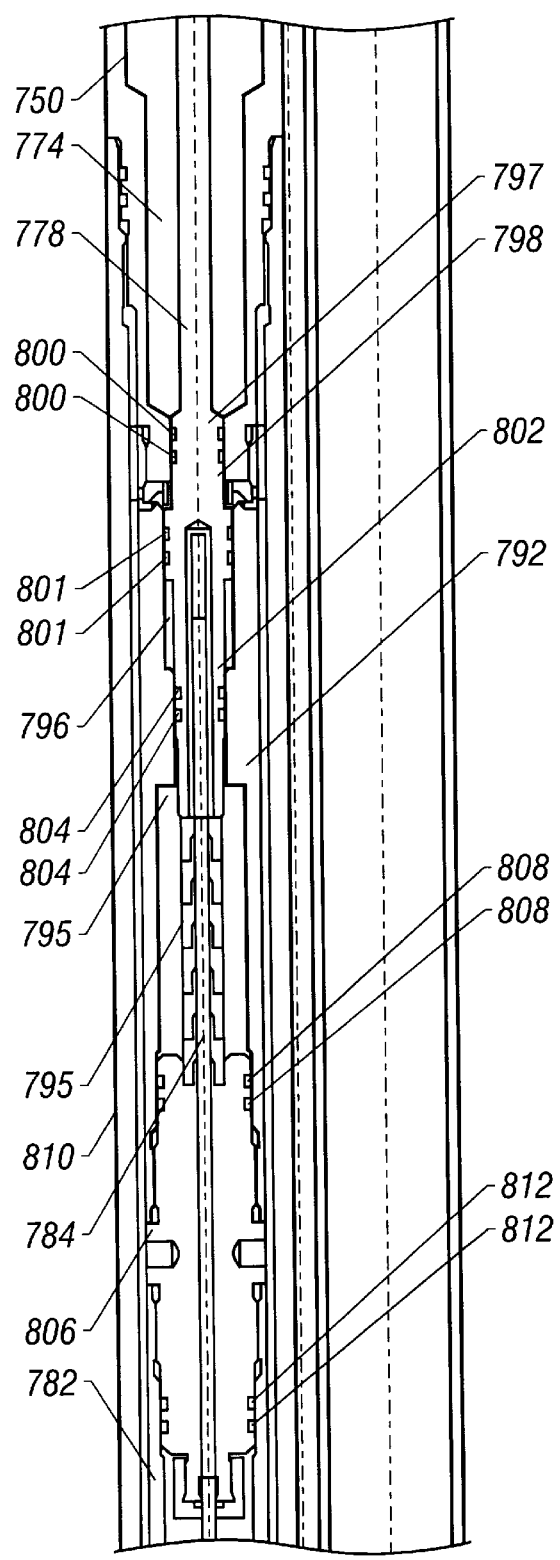
Figure 9F:
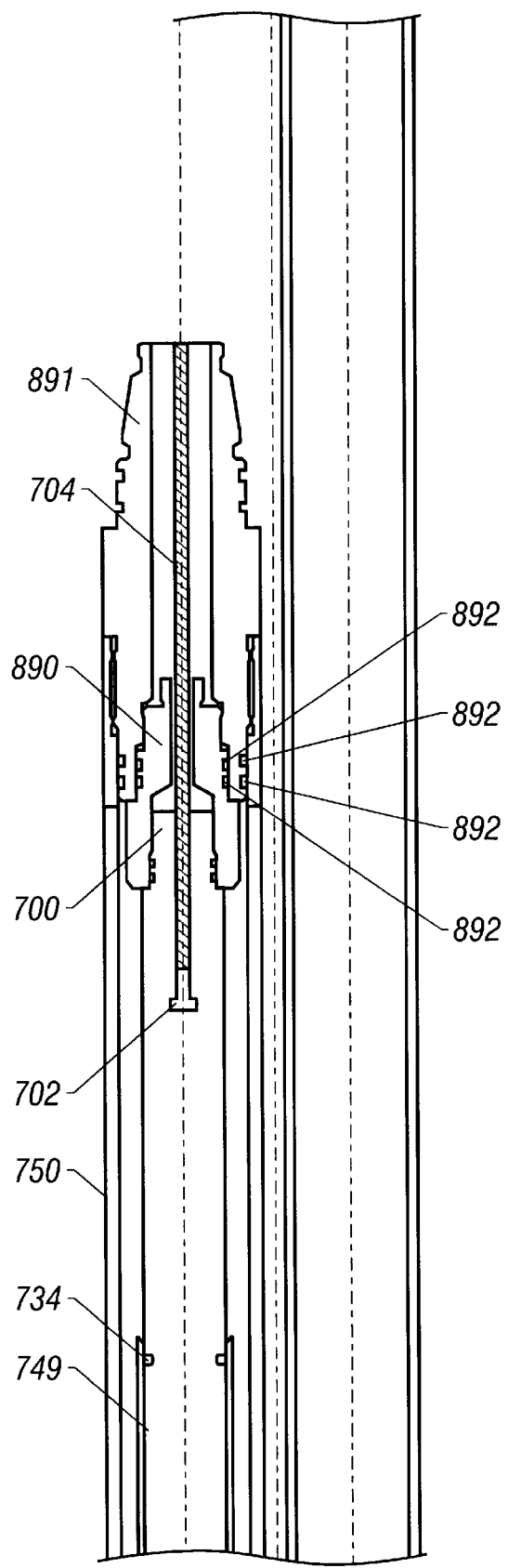
Figures 10A, 10B:
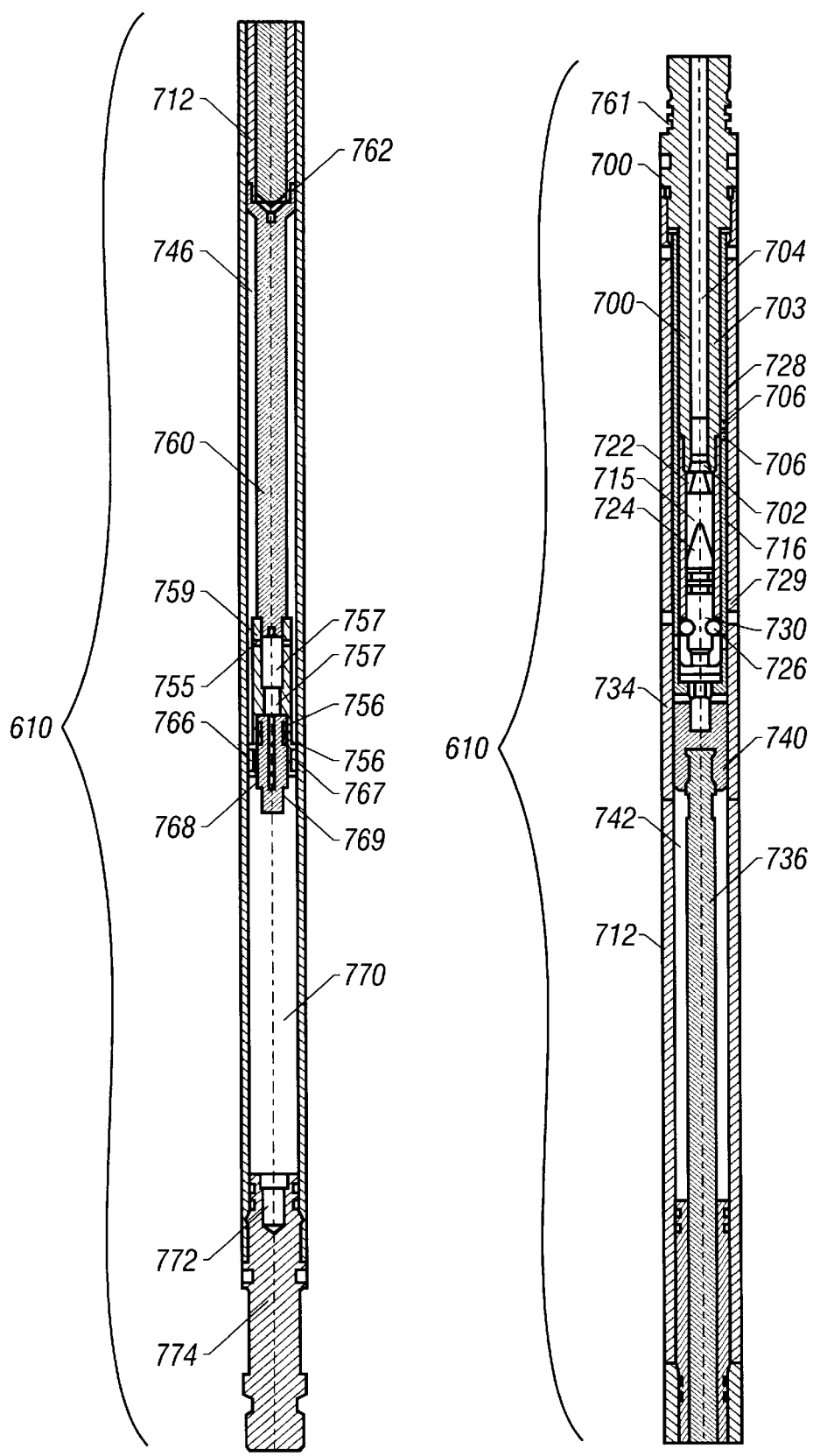
FIGS. 10A–10B are diagrams of the hydraulic delay module.

As shown in FIG. 10B, the housing 712 of the HDM 610 is connected at its lower end to a connector piece 700 having outer threads 701 for connecting the HDM 610 to the housing of the firing module 608 (FIG. 9F). A neck portion 703 of the connector piece 700 extends inside the housing 712. The detonating cord 704 (such as a Primacord) extends through the connector piece 700 and is attached to the percussion detonator 702, which sits on a shoulder extending from the neck portion 703 of the connector piece 700. The neck portion 703 of the connector piece 700 is threadably connected to the bottom portion of a firing pin housing 716, with the threaded connection being sealed with O-ring seals 706. The percussion detonator 702 is further held in place by a detonator retainer ring 722 inside the firing pin housing 716.

The percussion detonator 702 is activated by the firing pin assembly 632 (FIG. 8), which includes a firing pin 724 and a locking mechanism formed in part by ball bearings 726, a release sleeve 728, a movable push rod 736, and ball bearings 734. The firing pin 724 is driven by differential pressure to impact the detonator 702. To lock the firing pin 724 against axial movement, it has a circumferential slot 730 for receiving the ball bearings 726. The firing pin housing 716 includes openings for receiving the ball bearings 726, which are held in the slot 730 of the firing pin 724 and the openings of the piston housing 716 by the release sleeve 728. The release sleeve 728 is threadably connected to the movable push rod 736. A fluid seal 740 is inserted between the release sleeve 728 and the inner wall of the housing 712.

The ball bearings 726 lock the firing pin 724 from movement while the release sleeve 728 is in its lower position. Further, additional ball bearings 734 lock the release sleeve 728 while a firing module release sleeve 749 (FIG. 9E) is in its lower position. Thus, the locking mechanism 632 includes a two-part lock, in which the ball bearings 734 must first be released before the release sleeve 728 can be lifted to release ball bearings 726. The ball bearings 734 lock movement of a push rod assembly that includes the push rod 736, the release sleeve 728, and an upper rod 760 (FIG. 10A) that is threadably connected to the push rod 736.

When the firing apparatus 600 is downhole, a chamber 751 above the firing pin 724 is filled with well fluid and a chamber 715 below the firing pin 724 is filled with air. Thus, when the ball bearings 726 are released, differential pressure will drive the firing pin 724 into the percussion detonator 702 to initiate a detonation wave in the detonating cord 704.

As shown in FIG. 10A, the upper end of the movable push rod 736 is threadably connected to the bottom end of the upper rod 760 at 762. The chamber 746 surrounding the upper rod 760 is initially filled with air. Thus, when the perforating apparatus 600 is positioned downhole, well fluid in the chamber 742 applies an upwards pressure against the push rod 736. However, the ball bearings 734 lock the push rod assembly in place, preventing movement.

The top portion of the upper rod 760 is threadably connected to an orifice piston 758. The top portion of the orifice piston 758 has a slot in which a seal 766 sits to prevent fluid flow from a reservoir 770 (filled with oil) above the orifice piston 758 from flowing into the chamber 746. An orifice member 768 is threaded inside the orifice piston 758. The orifice member 768 has a neck portion 769 in which a small orifice extends axially. A conduit 767 extends from the orifice to a larger conduit 757 in the orifice piston 758.

While the ball bearings 734 lock the push rod assembly in place, no fluid flow occurs from the oil reservoir 770 through the small orifice in the neck portion 769 of the orifice member 768. The orifice in neck portion 769 has a sufficiently small diameter that oil is unable to leak through absent movement of the orifice member 768 upwards. Thus, when the ball bearings 734 are released, differential pressure between the chamber 742 and the chamber 746 forces the push rod assembly upwards, causing oil in the reservoir 770 to flow through the small orifice, conduits 756 and 757, and slots 755 into the chamber 746.

Oil flowing out of the reservoir 770 allows the push rod assembly to rise until the reservoir 770 is depleted and the orifice piston 758 and orifice member 768 is pushed into a cavity 772 to prevent further movement. The slow rate of fluid flow through the orifice provides the desired delay before the firing pin 724 is released.

The top portion of the housing 712 of the HDM 610 is threadably and sealably connected to an adapter 774. The entire HDM 610 is enclosed inside the bottom housing section 750 of the firing module 608. FIG. 9F illustrates the lower part of the firing module 608 and relevant portions of the HDM 610, including the ball bearings 734, the percussion detonator 702, and the connector piece 700. The connector piece 700 of the HDM 610 is threadably and sealably connected to a sleeve 890, whose outer surface contains threads for mating with the inner threads of an adaptor 891. The adaptor 891 is further connected to the bottom housing section 750 of the firing module 608. Connections between the sleeve 890, the adaptor 891, and the bottom housing section 750 are sealed with O-ring seals 892. The adaptor 891 provides external threads for connection to the perforating gun.

The ball bearings 734 are locked in place while the release sleeve 749 is in its down position, thereby preventing movement of the push rod 736 (FIG. 10B). The release sleeve is lifted by the release piston in the safety mechanism 630 when the frangible element is shattered in response to electrical activation of the firing module 608. If the release sleeve 749 is lifted by a sufficient distance, then the ball bearings 734 can fall out to release the push rod 736.

As shown in FIGS. 9D and 9E, a chamber 780 inside the release sleeve 749 holds the HDM 610. The release sleeve 749 is located inside the bottom housing section 750 of the firing module 608. The top portion of the release sleeve 749 is threadably connected to the bottom of the release piston 778. In operation, the release piston 778 is lifted by an applied differential pressure to lift the firing module release sleeve 749.

The safety mechanism 630 (FIG. 8) of the firing module 608 includes the release piston 778 and a frangible element 794 (FIG. 9C). To prevent movement of the release piston 778 until firing is desired, the frangible element (formed of multiple break plugs) 794 is positioned above the release piston 778. Each of the break plugs 794 can be made of a cast iron material, such white iron, gray iron, ductile iron, or malleable iron. A detonating cord 784 runs through the frangible element 794. Once initiated, a detonation wave is transmitted through the detonating cord 784 to shatter the break plugs 794, which fall into the region 795 (filled with air) to allow the release piston 778 to be pushed up by an applied differential pressure.

As shown in FIG. 9C, the bottom housing section 750 of the firing module 608 is threadably and sealably connected to the top housing section 810. In addition, the bottom housing section 750 is threadably connected to an inner tube 792.

The release piston 778 includes a first protruding portion 797 having circumferential grooves in its outer surface to receive O-ring seals 800. The outer surface of the first protruding portion 797 is pressed against the inner wall of the firing module bottom housing section 750 to seal against well fluid in the chamber 774 (when the perforating apparatus 600 is located downhole). The release piston 778 also includes two other protruding portions 798 and 802 each having grooves to receive O-ring seals 801 and 804, respectively. The protruding portions 798 and 802 of the release piston 778 are contacted against the inner wall of the tube 792 to isolate an air chamber 796.

The differential pressure created by the pressure applied by the well fluid in the chamber 774 and the air pressure in the air chamber 796 generates a force to push the release piston 778 in an upwards direction in the firing module 608 once the frangible element 794 is shattered. The applied differential pressure force must be sufficient to lift the release piston 778 along with the release sleeve 749.

A connector piece 806 connects the inner tube 792 to another tube 782, with the connections being sealed with O-ring seals 808 and 812. As shown in FIG. 9B, the tube 782 houses the electrical detonator 814, which is connected to the top end of the detonating cord 784 by crimping the outer shell (which can be made of aluminum) of the detonator 814 around the detonating cord 784.

The electric detonator 814 is connected to electrical wires 820 and 824, which are in turn attached to electrically conductive rods 826a and 826b, respectively, which pass through an electric line adaptor 842 connected to the upper end of the tube 782. Suitable fluid seals are used with the connector 842 to prevent fluid from leaking into the tube 782. The rods 826a and 826b terminate as electric contacts 840a and 840b, respectively, which are connected by wires 604a and 604b (FIG. 8) to the female coil 606.

The top housing section 810 of the firing module 608 is threadably connected at its top end to a swivel connector member 846 that is integral with a flange 847. The flange 847 is mounted on a seat extending inside a production tubing housing section 848. The swivel connector member 846 can be rotated with respect to the production tubing housing section 848. Thus, if necessary, the perforating apparatus 600 can be swiveled to adjust the shooting direction of the perforating gun 612.

As shown in FIG. 9A, the top end of the housing section 848 is threadably connected to a top housing section 850 of the short string production tubing 601 connected in a Y-tool configuration to the main production tubing 602. A groove extends around the outer surface of the main production tubing 602 for receiving the female coil 606. A female coil housing member 832 covers the female coil 606 and is attached to the production tubing 602 by screws 830. Wires 604a and 604b extend from the female coil 606 to the perforating apparatus 600.

In sum, to fire the perforating gun, a chain of events must occur. First, the male coil member 605 is lowered downhole and vertically aligned with the female coil 606. The male coil member is energized to induce current flow in the female coil 606 and wires 604a and 604b. The current flow transmitted through the wires 604a and 604b activates the electric detonator 814 and initiates the detonating cord 784. Next, the frangible element 794 is shattered to allow the force applied by the differential pressure (created by the difference in pressure of downhole well fluids and the air chamber 796) to lift the release piston 778 and release sleeve 749. Lifting the release sleeve 749 by a predetermined distance releases ball bearings 734. This starts the delay mechanism in the HDM 610, in which oil from the reservoir 770 flows at a relatively slow rate into the chamber 746 as the push rod assembly rises up. When the release sleeve 728 is lifted by the push rod 736 over the ball bearings 726, hydrostatic pressure drives the firing pin 724 into the percussion detonator 702.

A first safety feature in the firing module 608 is that the differential pressure applied downhole must be sufficient to lift the release piston 778 and the release sleeve 749. Without the required differential pressure, no effective ballistic connection is made in the firing module/HDM assembly.

A further safety feature is the delay mechanism in the HDM 610, which gives time to the surface well operator to move the male member 605 a sufficient distance away from the perforating apparatus 600 (or completely out of the wellbore) after activation before firing occurs.

In addition, the firing module 608 in cooperation with the HDM 610 provides a further safety feature to prevent accidental firing of the perforating gun on the surface while the perforating apparatus 600 is being armed and attached. Even though the firing module 608 is electrically connected before the tool assembly is lowered downhole, no ballistic connection is made in the firing module/HDM assembly while the tool assembly remains on the surface at the wellsite, which prevents the accidental firing of the perforating gun.

Other embodiments are within the scope of the following claims. For example, other forms of contactless energy transfer system can be used besides an inductive coupler. A light source (e.g., laser or infrared) can be lowered downhole, and a laser or infrared detector can be positioned downhole to receive the generated light. A local power source can then be used to activate the downhole devices in response to detection of the light.

What is claimed is:

1. A well completion apparatus disposed in a wellbore, the apparatus comprising:
   first and second tubings;
   a tool disposed in the second tubing; and
   an inductive coupler, including:
      a first coil moveable in the first tubing to and past the tool in the second tubing, the first coil adapted to receive an input signal; and
      a second coil electrically connected to the tool for inductively coupling to the first coil, an output signal being generated in the second coil in response to the input signal to activate the tool.

2. The apparatus of claim 1, wherein the tool includes a perforating gun.

3. The apparatus of claim 1, further comprising:
   a third tubing; and
   a second tool disposed in the third tubing,
   the inductive coupler having an additional second coil electrically connected to the second tool for inductively coupling to the first coil, a second output signal being generated in the additional second coil in response to the input signal received in the first coil when the first coil is positioned adjacent the additional second coil to activate the second tool.

4. The apparatus of claim 3, wherein the first coil is movable in the first tubing for selectively positioning the first coil adjacent one of the second coils.

5. A well completion apparatus disposed in a wellbore having a first zone and a second zone, the apparatus comprising:
   first and second tools disposed in the first and second zones, respectively; and
   an inductive coupler, including:
      a first coil located in the wellbore and adapted to receive an input signal;
      a plurality of second coils electrically connected to respective first and second tools,
      wherein the first coil is movable in the wellbore for selectively positioning the first coil adjacent the second coils to selectively activate the first and second tools in response to the input signal.

6. The apparatus of claim 5, further comprising:

a first tubing extending through the second zone to the first zone, the first coil being positioned in and moveable in the first tubing;

a second tubing extending to the second zone, the first and second tubings receiving production fluids from respective first and second zones.

7. The apparatus of claim 6, wherein the second tubing is connected to the first tubing in a Y-tool configuration.

8. The apparatus of claim 5, wherein the first and second tools each includes a perforating gun.

9. A well completion apparatus disposed in a wellbore having a first zone and a second zone, the apparatus comprising:

first and second downhole devices disposed in the first and second zones, respectively; and an energy coupler, including:

an energy source movable in the wellbore and adapted to receive an activating signal;

a first energy coupler portion responsive to the activating signal in an electrically contactless fashion; and a second energy coupler portion responsive to the activating signal in an electrically contactless fashion, wherein the energy source is movable in the tubing for selectively positioning the energy source adjacent the first and second energy generators to selectively activate the first and second tools.

10. The apparatus of claim 9, further comprising:

a first tubing extending through the second zone and to the first zone, the energy source positioned in and moveable in the first tubing;

a second tubing extending to the second zone, the first and second tubings receiving production fluid from respective first and second zones.

11. The apparatus of claim 10, wherein the second tubing is connected to the first tubing in a Y-tool configuration.

12. The apparatus of claim 9, wherein the first and second tools each includes a perforating gun.

13. A method of activating a downhole device located in a first tubing in a wellbore, the method comprising:

lowering a first coil member down a second tubing;

providing an input signal to the first coil member when the first coil member is positioned adjacent a second coil member electrically coupled to the downhole device, wherein an output signal is induced in the second coil member to activate the downhole device; and further lowering the first coil member in the second tubing past the downhole device.

14. The method of claim 13, wherein the downhole device includes a perforating gun.

15. The method of claim 13, wherein a second downhole device electrically coupled to an additional second coil member is located in a third tubing, the method further comprising:

moving the first coil member to selectively position the first coil member adjacent one of the second coil members to selectively activate the first and second downhole devices.

16. A method of activating first and second tools disposed in first and second zones, respectively, of a wellbore, the method comprising:

lowering a first coil member down the wellbore; and providing an input signal to the first coil member once the first coil member is selectively positioned adjacent one of a plurality of second coil members to selectively activate the first or second tool.

17. An apparatus for activating a plurality of downhole devices in a well, comprising:

a tubing;

first inductive coupler portions positioned at different depths in the well and attached to the tubing; and a second inductive coupler portion moveable in the first tubing into selective alignment with one of the first inductive coupler portions and adapted to receive signals to generate respective signals in the first inductive coupler portions for activating the downhole devices.

18. The apparatus of claim 17, wherein the second inductive coupler portion includes a male coil.

19. The apparatus of claim 17, wherein the first inductive coupler portions include female coils.

20. Apparatus for activating a plurality of downhole devices in a well, comprising:

a tubing; and an energy coupler, including:

an energy source moveable in the tubing and adapted to generate an activating signal; and a plurality of signal generators attached to the tubing at different depths in the wellbore, the energy source being selectively moveable to one of the plurality of signal generators, each signal generator being adapted to receive in an electrically contactless fashion the activating signal to activate a corresponding one of the downhole devices.

21. A method of activating a plurality of downhole devices in a plurality of respective zones in a wellbore, comprising:

lowering an energy source down the wellbore;

selectively positioning the energy source adjacent one of a plurality of signal generators electrically coupled to respective downhole devices; and energizing the energy source to generate a signal in one of the signal generators to activate a respective downhole device.

22. A well completion apparatus disposed in a wellbore, comprising:

a plurality of perforating guns;

first inductive coupler portions for activating respective perforating guns;

a second inductively coupler portion selectively positionable adjacent one of the first inductive coupler portions, the second inductive coupler portion adapted to receive an input signal that is coupled to one of the first inductive coupler portions, each perforating gun including an electrically activatable firing module, a detonating assembly, and an actuating system coupled to the firing module for ballistically coupling the firing module to the detonating assembly in response to presence of greater than a predetermined amount of pressure.

23. The apparatus of claim 22, wherein the actuating system includes a release piston movable by fluid pressure to ballistically connect the firing module to the detonating assembly.

24. The apparatus of claim 23, wherein the actuating system further includes a frangible element adapted to hold the release piston in place, the frangible element being shattered in response to electrical activation of the firing module.

25. The apparatus of claim 23, wherein the actuating assembly further includes a chamber filled with well fluid and a chamber filled with air, the release piston being movable by differential pressure between the fluid chamber and the air chamber.

26. The apparatus of claim 22, wherein each perforating gun further includes a delay mechanism to delay activation of the perforating gun by a predetermined time period.

27. The apparatus of claim 26, wherein the delay mechanism includes a hydraulic delay module.

* * * * *